(12) United States Patent
Tavera (10) Patent No.: US 10,965,799 B2
(45) Date of Patent: Mar. 30, 2021

(54) SANITARY SLEEVE FOR AN ELECTRONIC DEVICE

(71) Applicant: Anthony Tavera, Glendale, CA (US)

(72) Inventor: Anthony Tavera, Glendale, CA (US)

( * ) Notice: Subject to any disclaimer, the term of this patent is extended or adjusted under 35 U.S.C. 154(b) by 7 days.

(21) Appl. No.: 16/584,049

(22) Filed: Sep. 26, 2019

(65) Prior Publication Data

US 2020/0106870 A1  Apr. 2, 2020

Related U.S. Application Data

(60) Provisional application No. 62/739,222, filed on Sep. 29, 2018.

(51) Int. Cl.
*H04M 1/17* (2006.01)

(52) U.S. Cl.
CPC .................................... *H04M 1/17* (2013.01)

(58) Field of Classification Search
None
See application file for complete search history.

(56) References Cited

U.S. PATENT DOCUMENTS

| | | | | |
|---|---|---|---|---|
| 5,012,513 A | * | 4/1991 | Dale | H04M 1/18 379/440 |
| 8,605,892 B1 | * | 12/2013 | Owens | H04M 1/17 379/452 |
| 2005/0254643 A1 | * | 11/2005 | Hall | H04M 1/17 379/452 |
| 2007/0140476 A1 | * | 6/2007 | Gathright | H04M 1/17 379/439 |
| 2009/0060173 A1 | * | 3/2009 | Williams | H04R 1/12 379/452 |

* cited by examiner

*Primary Examiner* — Tuan D Nguyen (74) *Attorney, Agent, or Firm* — Dhiraj Jindal; Patent Yogi LLC (57) ABSTRACT

Disclosed is a sanitary sleeve for an electronic device. The sanitary sleeve comprising a top flexible member, wherein one or more edges of the top flexible member may be joined with one or more edges of a bottom flexible member to provide a housing between the top flexible member and the bottom flexible member. Further, the housing may be configured to retain the electronic device. Further, the top flexible member may include two panels separated by a slit-like aperture to allow insertion of the electronic device within the housing.

20 Claims, 8 Drawing Sheets

SANITARY SLEEVE FOR AN ELECTRONIC DEVICE

RELATED APPLICATION(S)

Under provisions of 35 U.S.C. § 119e, the Applicant(s) claim the benefit of U.S. provisional application no. 62739222, titled "Sanitary sleeve for telephone receiver", filed on Sep. 29, 2018 which is incorporated herein by reference.

TECHNICAL FIELD

Generally, the present disclosure relates to sanitary sleeves. More specifically, the present disclosure relates to a sanitary sleeve for electronic devices.

BACKGROUND

In spite of the proliferation of cellphones, the receiver of a conventional wired telephone is still the most frequent vector for many types of diseases, including the common cold. Pay telephones, desk telephones in shared offices, and telephones made available at such locations as county jails and homeless shelters are particularly problematic.

Therefore, there is a need for an improved sanitary sleeve for electronic devices that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a sanitary sleeve for an electronic device. The sanitary sleeve comprising a top flexible member, wherein one or more edges of the top flexible member may be joined with one or more edges of a bottom flexible member to provide a housing between the top flexible member and the bottom flexible member. Further, the housing may be configured to retain the electronic device. Further, the top flexible member may include two panels separated by a slit-like aperture to allow insertion of the electronic device within the housing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of sanitary sleeve for electronic devices, embodiments of the present disclosure are not limited to use only in this context.

Overview:

According to some embodiments, the present disclosure is directed to a sanitary sleeve for a telephone receiver. The sanitary sleeve for a telephone receiver may prevent the transfer of disease pathogens while allowing clearly audible telephone calls. Further, the sanitary sleeve may be disposable and may not muffle or obstruct sound significantly. Further, the sleeve may provide a slit-like aperture such that the aperture may rest along the centerline of the rear surface of the telephone receiver when in use.

Figure 1:
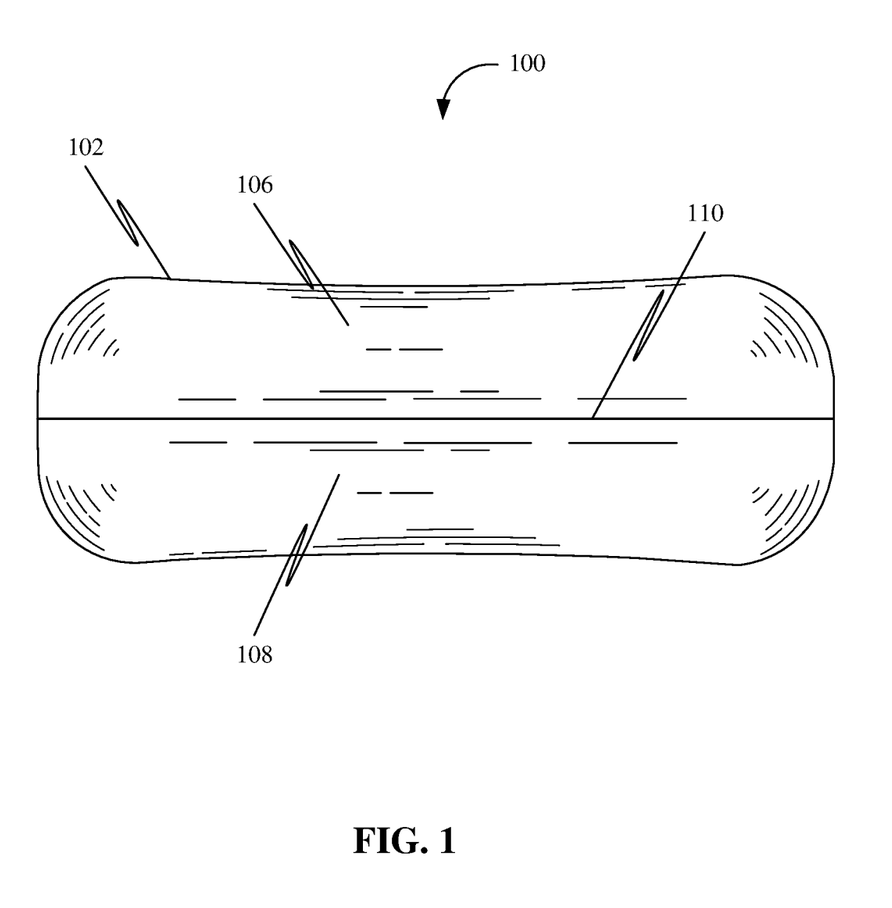
FIG. 1 is a top view of a sanitary sleeve for an electronic device, in accordance with some embodiments.
Figure 2:
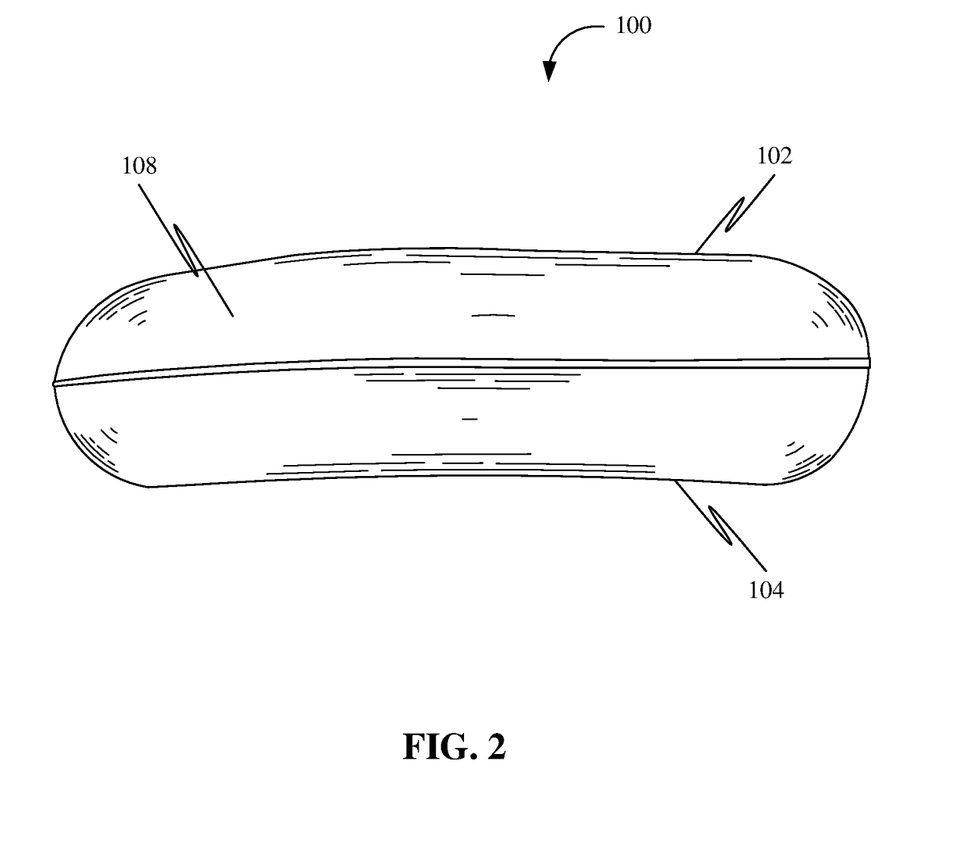
FIG. 2 is a side view of the sanitary sleeve for the electronic device, in accordance with some embodiments.
Figure 3:
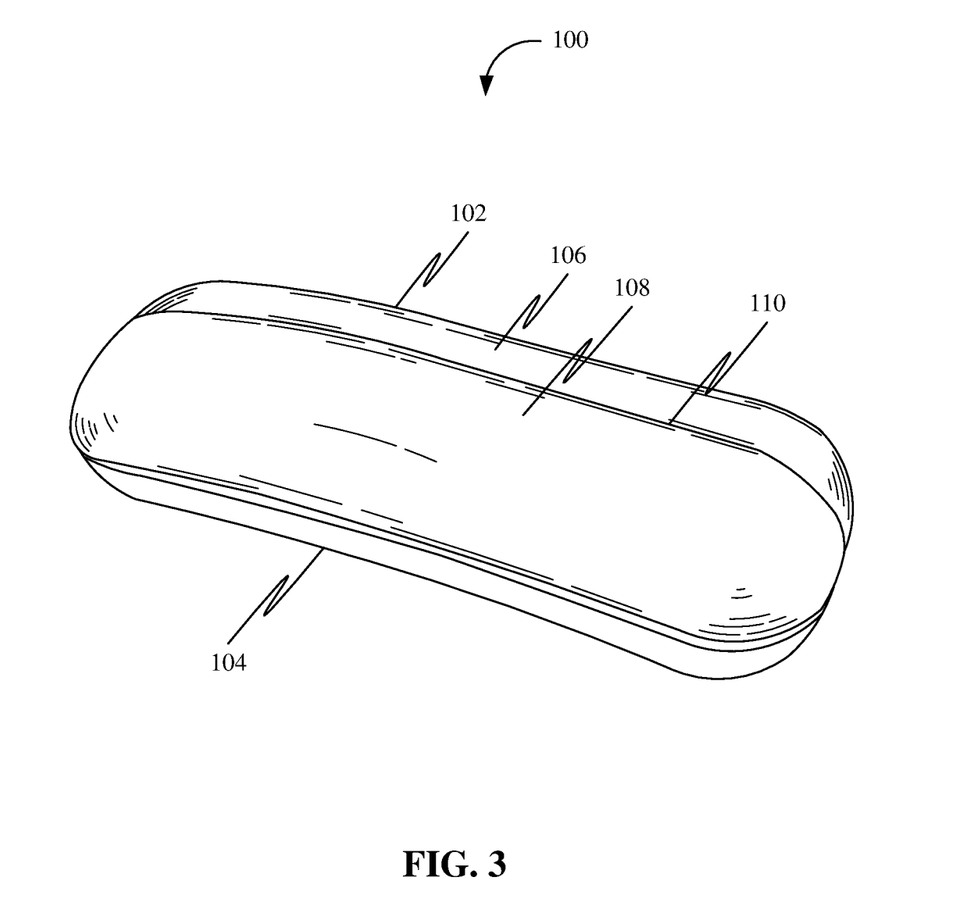
FIG. 3 is a top perspective view of the sanitary sleeve for the electronic device, in accordance with some embodiments.

FIG. 1 is a top view of a sanitary sleeve 100 for an electronic device, in accordance with some embodiments. FIG. 2 is a side view of the sanitary sleeve 100 for the electronic device. FIG. 3 is a top perspective view of the sanitary sleeve 100 for the electronic device.

Figure 4:
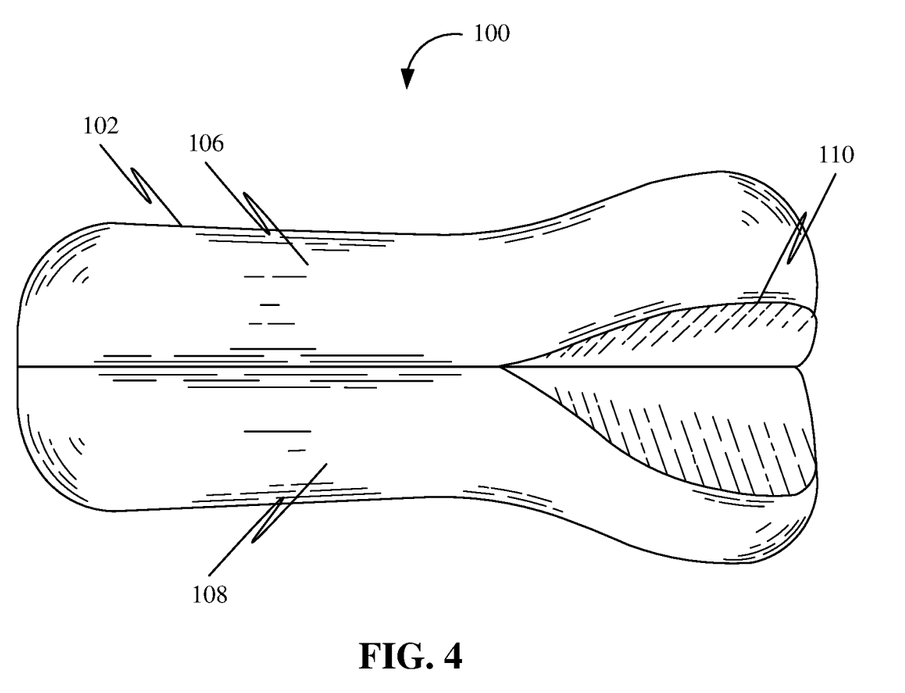
FIG. 4 is a top view of the sanitary sleeve with two panels partially opened, in accordance with some embodiments.
Figure 5:
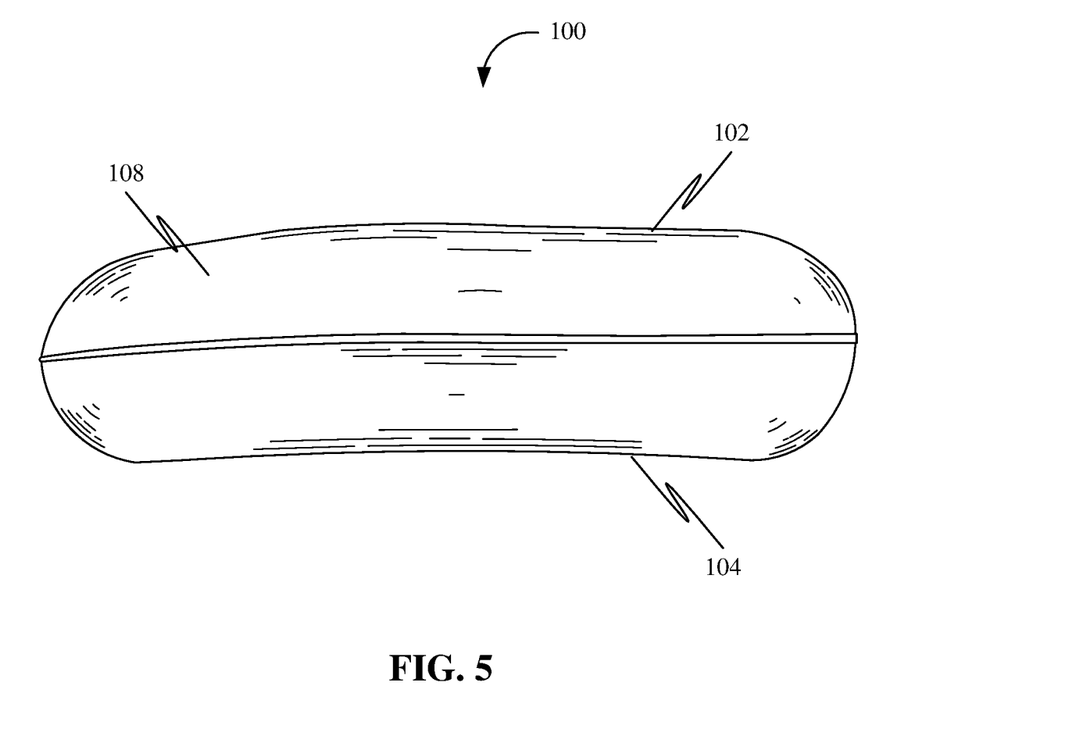
FIG. 5 is a side view of the sanitary sleeve with the two panels partially opened, in accordance with some embodiments.
Figure 6:
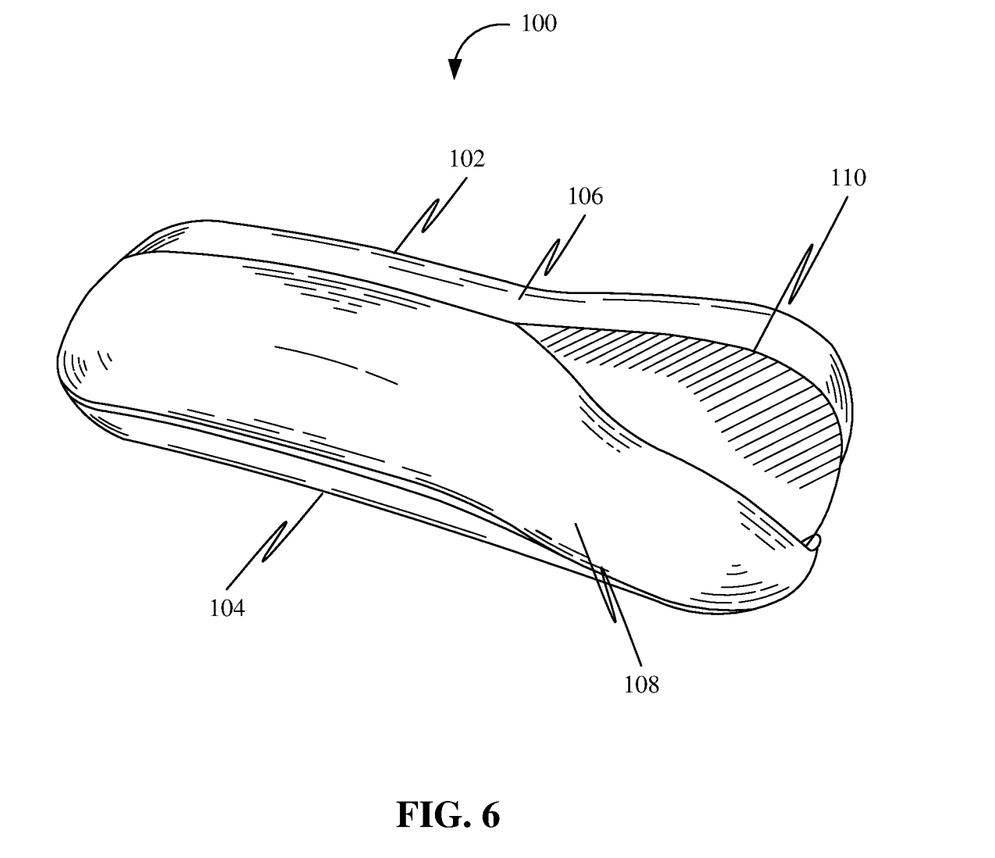
FIG. 6 is a top perspective view of the sanitary sleeve with the two panels partially opened, in accordance with some embodiments.

FIG. 4 is a top view of the sanitary sleeve 100 with two panels 106-108 partially opened, in accordance with some embodiments. FIG. 5 is a side view of the sanitary sleeve 100 with the two panels 106-108 partially opened. FIG. 6 is a top perspective view of the sanitary sleeve 100 with the two panels 106-108 partially opened.

Figure 7:
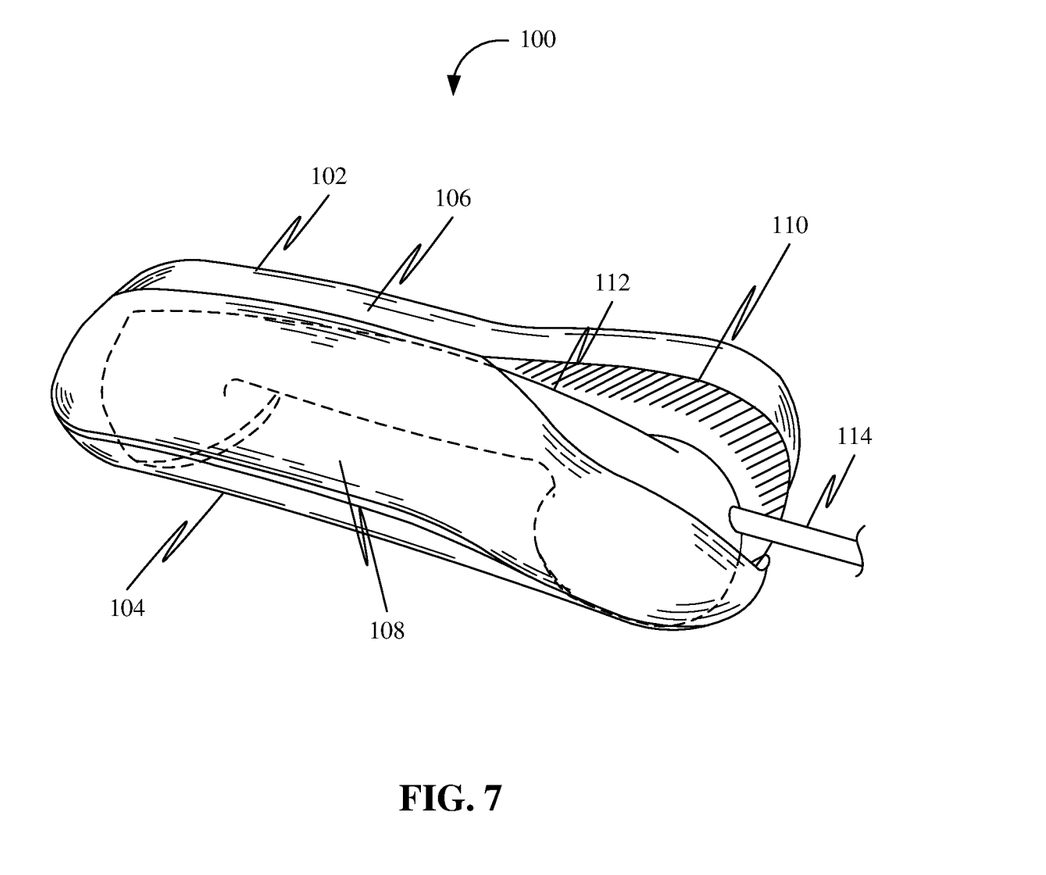
FIG. 7 is a top perspective view of the sanitary sleeve with a telephone receiver enclosed, in accordance with some embodiments.
Figure 8:
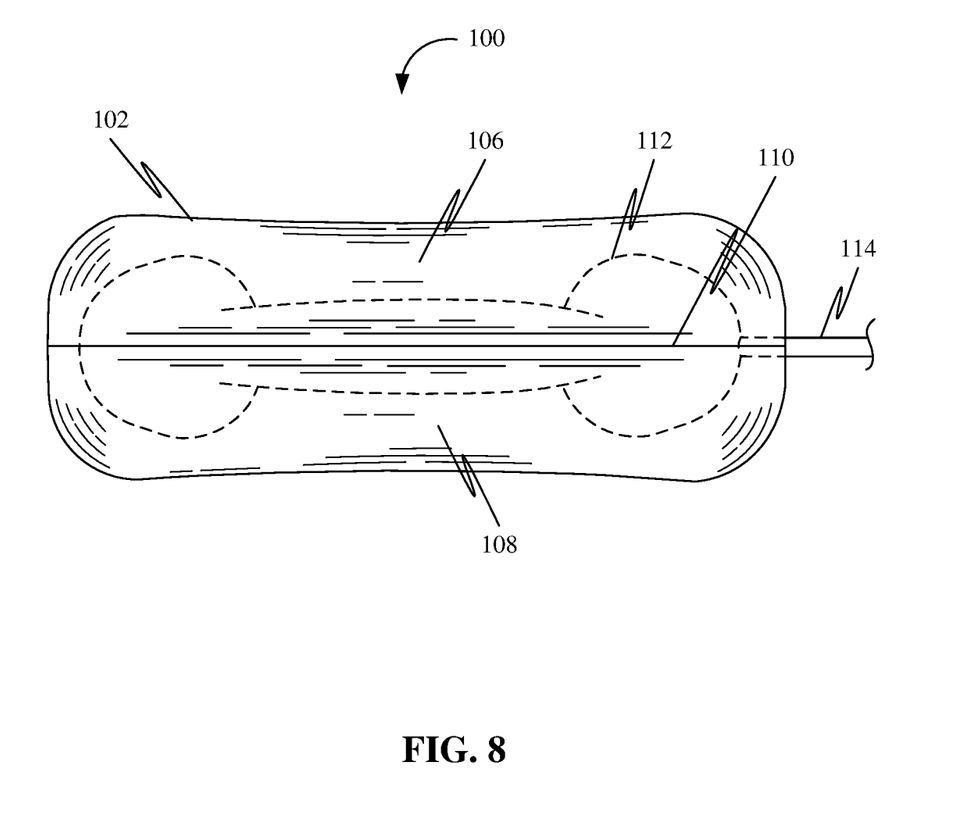
FIG. 8 is a top perspective view of the sanitary sleeve with the telephone receiver enclosed, in accordance with some embodiments.

FIG. 7 is a top perspective view of the sanitary sleeve 100 with a telephone receiver 112 enclosed, in accordance with some embodiments. FIG. 8 is a top perspective view of the sanitary sleeve 100 with the telephone receiver 112 enclosed.

According to some embodiments, the sanitary sleeve 100 for an electronic device. The sanitary sleeve 100 may protect a user from the disease pathogens of other users. The sanitary sleeve 100 may include a top flexible member 102, wherein one or more edges of the top flexible member 102 may be joined with one or more edges of a bottom flexible member 104 to provide a housing between the top flexible member 102 and the bottom flexible member 104. Further, the housing may be configured to retain the electronic device. Further, a user of the electronic device may insert the electronic device within the sanitary sleeve 100 through the slit-like aperture 110.

In some embodiments, the electronic device may be a telephone receiver 112 (shown in FIGS. 7-8). Further, a cord of the electronic device (such as the telephone receiver 112) may protrude from one end of the slit-like aperture 110.

Further, the bottom flexible member 104 may allow sound from the electronic device to be heard by a user of the electronic device. Further, the bottom flexible member 104 is made from a thin gauge material.

In some embodiments, the top flexible member 102 and the bottom flexible member 104 may be made from a flexible and disposable fabric, such as nonwoven polypropylene.

Further, the top flexible member 102 may include the two panels 106-108 separated by a slit-like aperture 110 to allow insertion of the electronic device within the housing. Further, the slit-like aperture 110 may rest along a centerline of the rear surface of the electronic device when the electronic device is in use. Further, the two panels 106-108 may have the same size.

Further, the housing may include a soft filing to securely retain the electronic device within the housing. Further, the soft filing may include at least one of a cotton, wool, polyester fiberfill, shredded memory foam, microbeads, shredded latex, and Styrofoam.

In some embodiments, the one or more edges of the top flexible member 102 may be permanently joined with the one or more edges of the bottom flexible member 104 via one or more of sewing using a thread and applying an adhesive.

In alternate embodiments, the one or more edges of the top flexible member 102 may be detachably joined with the one or more edges of the bottom flexible member 104 via a fastening means. Further, the fastening means may include one or more of a hook-and-loop fastener, Velcro™, snaps, zippers, buttons, magnets, fabric ties, latches, and pins.

In an exemplary embodiment, each of the top flexible member 102 and the bottom flexible member 104 may include four edges. Further, the four edges of the top flexible member 102 may be joined with corresponding four edges of the bottom flexible member 104 to provide the housing to retain the electronic device.

In further embodiments, the sanitary sleeve 100 may include a fastener configured to partially close the slit-like aperture 110.

In further embodiments, the sanitary sleeve 100 may include a fastener configured to close the slit-like aperture 110.

In some embodiments, the edges of the two panels 106-108 forming the slit-like aperture 110 may be joined together via a fastening means to at least partially close the slit-like aperture 110. Further, the fastening means may include one or more of a hook-and-loop fastener, Velcro™, snaps, zippers, buttons, magnets, fabric ties, latches, and pins.

According to some embodiments, the sanitary sleeve 100 may be configured to retain the telephone receiver 112 as shown in FIGS. 7-8. The sanitary sleeve 100 may include two panels 106-108 on the top surface 102 separated by a slit-like aperture 110, which is intended to cover and enclose the telephone receiver 112 such that each user is protected from the disease pathogens of other users. The aperture 110 may rest along the centerline of the bottom surface 104 of the telephone receiver 112 when in use, and a cord 114 of the telephone receiver 112 emerges from one end of the aperture 110.

Further, the bottom surface 104 of the sanitary sleeve 100 may be manufactured from a thin gauge material such that sound is not significantly muffled or obstructed, preferably a nonwoven polypropylene fabric of 45 grams per square meter. The user may conduct a normal conversation using the telephone receiver 112.

Further, the user may insert the telephone receiver 112 into the sleeve 100, such that the cord 114 of the telephone receiver 112 may protrude from one end of the aperture 110, and close a fastener of the aperture 110. The user may then use the telephone as desired.

Components, component sizes, and materials listed above are preferable, but artisans will recognize that alternate components and materials could be selected without altering the scope of the invention.

Although the present disclosure has been explained in relation to its preferred embodiment, it is to be understood that many other possible modifications and variations can be made without departing from the spirit and scope of the disclosure.

I claim:

1. A sanitary sleeve for an electronic device, the sanitary sleeve comprising:
   a top flexible member, wherein one or more edges of the top flexible member are joined with one or more edges of a bottom flexible member to provide a housing between the top flexible member and the bottom flexible member, wherein the housing is configured to retain the electronic device; and
   the top flexible member includes two panels separated by a slit-like aperture to allow insertion of the electronic device within the housing.

2. The sanitary sleeve of claim 1 wherein the electronic device is a telephone receiver.

3. The sanitary sleeve of claim 1 wherein the one or more edges of the top flexible member are permanently joined with the one or more edges of the bottom flexible member via one or more of sewing using a thread and applying an adhesive.

4. The sanitary sleeve of claim 1 wherein the one or more edges of the top flexible member are detachably joined with the one or more edges of the bottom flexible member via a fastening means, wherein the fastening means includes one or more of a hook-and-loop fastener, Velcro#, snaps, zippers, buttons, magnets, fabric ties, latches, and pins.

5. The sanitary sleeve of claim 1 wherein each of the top flexible member and the bottom flexible member includes four edges, wherein the four edges of the top flexible member are joined with corresponding four edges of the bottom flexible member to provide the housing to retain the electronic device.

6. The sanitary sleeve of claim 1 wherein the slit-like aperture rests along a centerline of the rear surface of the electronic device when the electronic device is in use.

7. The sanitary sleeve of claim 1 wherein the bottom flexible member allows sound from the electronic device to be heard by a user of the electronic device.

8. The sanitary sleeve of claim 1 wherein the bottom flexible member is made from a thin gauge material.

9. The sanitary sleeve of claim 1 wherein a user of the electronic device inserts the electronic device within the sanitary sleeve through the slit-like aperture.

10. The sanitary sleeve of claim 1 wherein a cord of the electronic device protrudes from one end of the slit-like aperture.

11. The sanitary sleeve of claim 1 further comprising a fastener configured to partially close the slit-like aperture.

12. The sanitary sleeve of claim 1 further comprising a fastener configured to close the slit-like aperture.

13. The sanitary sleeve of claim 1 wherein the edges of the two panels forming the slit-like aperture are joined together via a fastening means to at least partially close the slit-like aperture.

14. The sanitary sleeve of claim 13 the fastening means includes one or more of a hook-and-loop fastener, Velcro™, snaps, zippers, buttons, magnets, fabric ties, latches, and pins.

15. The sanitary sleeve of claim 1 wherein the two panels are of equal size.

16. The sanitary sleeve of claim 1 wherein the top flexible member and the bottom flexible member is made from a flexible and disposable fabric.

17. The sanitary sleeve of claim 16 the flexible and disposable fabric is nonwoven polypropylene.

18. The sanitary sleeve of claim 1 wherein the housing includes a soft filing to securely retain the electronic device within the housing.

19. The sanitary sleeve of claim 18 wherein the soft filing is at least one of a cotton, wool, polyester fiberfill, shredded memory foam, microbeads, shredded latex, and Styrofoam.

20. The sanitary sleeve of claim 1 protects the user from the disease pathogens of other users.

* * * * *